[US010660302B2](#)

(12) United States Patent
Cortner et al.

(10) Patent No.: US 10,660,302 B2
(45) Date of Patent: May 26, 2020

(54) ABSORBENT CLUMPING ANIMAL LITTER COMPOSITIONS

(71) Applicant: Halliburton Energy Services, Inc., Houston, TX (US)

(72) Inventors: Thomas S. Cortner, Houston, TX (US); Jim Mabrey, Houston, TX (US); Eric Frantz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/443,622

(22) Filed: Jun. 17, 2019

(65) Prior Publication Data

US 2019/0297835 A1 Oct. 3, 2019

Related U.S. Application Data

(62) Division of application No. 14/897,939, filed as application No. PCT/US2013/061971 on Sep. 26, 2013, now Pat. No. 10,368,526.

(51) Int. Cl.
*A01K 1/015* (2006.01)

(52) U.S. Cl.
CPC .......... *A01K 1/0154* (2013.01); *A01K 1/0155* (2013.01)

(58) Field of Classification Search
CPC ... A01K 1/0154; A01K 1/0152; A01K 1/0155
See application file for complete search history.

(56) References Cited

U.S. PATENT DOCUMENTS

| | | | |
|---|---|---|---|
| 4,395,357 A | 7/1983 | Krämer et al. | |
| 4,459,368 A | 7/1984 | Jaffee et al. | |
| 4,622,920 A | 11/1986 | Goss | |
| 5,188,064 A | 2/1993 | House | |
| 5,207,830 A | 5/1993 | Cowan et al. | |
| 5,215,041 A | 6/1993 | Krahenbuhl | |
| 5,775,259 A | 7/1998 | Tucker | |
| 5,976,549 A | 11/1999 | Lewandowski | |
| 7,228,819 B1 * | 6/2007 | Wang | A01K 1/0152 119/171 |
| 7,429,421 B2 | 9/2008 | Greene et al. | |
| 7,603,964 B2 | 10/2009 | Jenkins et al. | |
| 7,757,638 B2 | 7/2010 | Wang et al. | |
| 2004/0025798 A1* | 2/2004 | Lee | A01K 1/0154 119/172 |
| 2005/0005869 A1 | 1/2005 | Fritter et al. | |
| 2005/0175577 A1* | 8/2005 | Jenkins | A01K 1/0152 424/76.1 |
| 2006/0243212 A1 | 11/2006 | Jenkins et al. | |
| 2008/0132632 A1 | 6/2008 | Schiraldi et al. | |
| 2011/0174228 A1* | 7/2011 | Liu | A01K 1/0154 119/173 |
| 2012/0260860 A1 | 10/2012 | Drief et al. | |
| 2012/0318205 A1 | 12/2012 | Kuras et al. | |
| 2013/0139760 A1 | 6/2013 | Fritter et al. | |
| 2013/0177620 A1 | 7/2013 | Jenkins et al. | |
| 2016/0044891 A1* | 2/2016 | Kuras | A01K 1/0154 514/770 |
| 2017/0265429 A1* | 9/2017 | Kuras | A01K 1/0155 |

FOREIGN PATENT DOCUMENTS

| | | |
|---|---|---|
| CA | 2607750 | 11/2006 |
| CA | 2607758 | 5/2008 |
| EP | 165820 | 12/1985 |
| EP | 885557 | 12/1998 |
| EP | 0885557 | 8/2004 |
| EP | 885557 | 11/2010 |
| WO | 8204408 | 6/1981 |
| WO | 0160148 | 8/2001 |
| WO | 2008007963 | 1/2008 |
| WO | 2009080822 | 7/2009 |
| WO | 2011091262 A2 | 7/2011 |
| WO | 2011091262 A3 | 11/2011 |
| WO | 2012174356 A2 | 12/2012 |
| WO | 2012174356 A3 | 12/2012 |
| WO | 2015047279 | 4/2015 |

OTHER PUBLICATIONS

Office Action for U.S. Appl. No. 14/897,939 dated Feb. 7, 2018.
Office Action for U.S. Appl. No. 14/897,939 dated Jul. 16, 2018.
Final Office Action for U.S. Appl. No. 14/897,939 dated Dec. 5, 2018.
GB Examination Report under Section 18(3) for Application No. GB1602020.8 dated May 3, 2018.
International Application Serial No. PCT/US2013/061971, International Search Report dated Jun. 8, 2014, 3 pg.
International Application Serial No. PCT/US2013-061971, Written Opinion dated Jun. 8, 2014, 6 pg.

* cited by examiner

*Primary Examiner* — Kristen C Hayes
(74) *Attorney, Agent, or Firm* — Tenley Krueger; C. Tumey Law Group PLLC

(57) ABSTRACT

Various embodiments disclosed relate to absorbent clumping animal litter compositions, and to methods of using and making the same. In some embodiments, the present invention provides an absorbent clumping animal litter composition including an absorbent component and a pumice component.

19 Claims, No Drawings

ABSORBENT CLUMPING ANIMAL LITTER COMPOSITIONS

BACKGROUND OF THE INVENTION

Many efforts have been made to develop an effective and inexpensive litter for animals, especially household pets, particularly cats. One type of animal litter is clumping animal litter, which "captures" the urine in a "ball" or "clump" of litter which can be scooped from the non-clumped (e.g., nonwetted) litter for easy removal. Although clumping litters have helped to eliminate the animal waste before it generates obnoxious odors, they still possess one or more undesirable properties or characteristics, including, for example, high bulk density, poor clumping ability, poor odor control, and dustiness.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

In various embodiments, the present invention provides an absorbent clumping animal litter composition. The litter composition includes an absorbent component. The litter composition also includes a pumice component.

In various embodiments, the present invention provides an absorbent clumping animal litter composition. The animal litter composition includes an absorbent component and a pumice component. The animal litter composition also includes an amorphous silica component.

In various embodiments, the present invention provides an absorbent clumping animal litter composition including an absorbent component. The animal litter composition also includes at least two components having a lower density than the absorbent component, such that the composition has a bulk density of equal to or less than about 50 lb/ft$^3$.

In various embodiments, the present invention provides an absorbent clumping animal litter composition. About 60 wt % to about 80 wt % of the animal litter composition is a bentonite component. The bentonite component includes about 80 wt % to about 100 wt % montmorillonite. About 20 wt % to about 35 wt % of the animal litter composition is a pumice component. The pumice component includes about 55 wt % to about 90 wt % $SiO_2$. About 0.01 wt % to about 8 wt % of the animal litter composition is an amorphous silica component. The amorphous silica component includes about 70 wt % to about 100 wt % silica. The animal litter composition has a compacted bulk density of about 35 lb/ft$^3$ to about 70 lb/ft$^3$.

In various embodiments, the present invention provides a system. The system includes an absorbent clumping animal litter composition. The animal litter composition includes an absorbent component and a pumice component. The system also includes a container for animal urination and defecation that includes the animal litter composition therein.

In various embodiments, the present invention provides a method of preparing an absorbent clumping animal litter composition. The method includes forming an absorbent clumping animal litter composition that includes an absorbent component and a pumice component.

In various embodiments, the present invention provides a method of using an absorbent clumping animal litter composition. The method includes placing an absorbent clumping animal litter composition in a container. The container is for animal urination and defecation (e.g., a litter box). The absorbent clumping animal litter composition includes an absorbent component and a pumice component. The method includes allowing an animal to at least one of urinate and defecate in the container, such that at least one of urine and feces from the animal contacts the clumping animal litter composition. The method includes allowing time to pass such that the clumping animal litter composition forms clumps at least in locations where the urine contacted the animal litter composition. The method includes at least partially removing the feces and clumps from the container to remove at least part of the feces and urine from the containers.

Various embodiments of the present invention provide certain advantages over other animal litter compositions and methods of using the same, at least some of which are unexpected. For example, in some embodiments, the animal litter composition can have a lower density as compared to other animal litter compositions. In some embodiments, the lower density can provide cost reductions for manufacture and sale of the animal litter composition, such as via less handling of the litter composition during manufacture, and easier transportation of the litter composition to a point of sale. In some embodiments, the lower density can provide a high level of convenience for the customer or user of the product, such as via easier transport and use of the product.

In some embodiments, despite having a lower density than other animal litter compositions, the litter composition can have a similar or greater clumping ability, such as an ability to quickly form strong clumps when urine contacts the litter composition. In some embodiments, despite having a lower density than other animal litter compositions, the litter composition can provide a similar or greater amount of dust control, such as an ability to produce only low levels of dust when pouring the litter composition into a litter container, when used by an animal for urination or defecation, or when clumps or feces are scooped from the litter container. In some embodiments, despite having a lower density than other animal litter compositions, the litter composition can provide a similar or lower amount of trackability, such as the amount of litter composition that is tracked out of a litter container containing the litter composition after the animal has finished urinating or defecating in the litter container. In some embodiments, despite having a lower density than other litter compositions, the litter composition can provide similar or greater odor control, such as the degree to which odor is controlled after an animal has urinated or defecated in the litter composition, or the degree to which odor is controlled after urine or feces has sat in the container for an extended time period without being removed. In some embodiments, despite having a lower density than other litter compositions and having silica such as amorphous silica present, the litter composition can provide similar or less segregation issues, such as less material settling out and de-homogenizing during transport or use of the animal litter composition.

Unlike animal litter compositions that use zero or one lower density component (e.g., lower density than the absorbent material base), some embodiments of the present invention provide an animal litter composition having multiple lower density components, such as pumice and silica in addition to the denser absorbent component. In various embodiments, the combination of pumice and silica such as amorphous silica can give superior density reduction with superior clumping strength without having segregation issues, as compared to other animal litters, such as animal litter containing pumice but no amorphous silica, or containing amorphous silica but no pumice. Unlike other animal litter compositions having lower density components, some embodiments of the present invention provide similar or fewer segregation issues, such as less material settling out and de-homogenizing during transport or use of the animal litter composition. Unlike other pumice-containing animal litters, some embodiments of the present invention provide little to no compromise in clumping strength over bentonite alone; some embodiments provide superior clumping strength over bentonite alone.

Animal litter composition.

In various embodiments, the present invention provides an absorbent clumping animal litter composition. When contacted by animal urine, the composition forms one or more clumps, allowing the urine to be conveniently removed from the composition by sifting the clump and any feces away from the unclumped (e.g., nonwetted) litter, leaving behind substantially unused and fresh litter for further use. The composition includes an absorbent component and a pumice component. In some embodiments, the composition also includes a silica component, such as an amorphous silica component. In other embodiments, the composition is substantially free of a silica component, or substantially free of an amorphous silica component.

In various embodiments, the animal litter composition can have a low compacted bulk density (e.g., the density of the litter following agitation to the point where no further volume changes are observed to occur). The compacted bulk density of the animal litter can be, for example, 35 lb/ft$^3$ to about 70 lb/ft$^3$, about 40 lb/ft$^3$ to about 55 lb/ft$^3$, or about 35 lb/ft$^3$ or less, or about 36 lb/ft$^3$, 37, 38, 39, 40, 41, 42, 43, 44, 45, 46, 47, 48, 49, 50, 51, 52, 53, 54, 55, 56, 57, 58, 59, 60, 62, 64, 66, 68, or about 70 lb/ft$^3$ or more.

Absorbent component.

The animal litter composition includes an absorbent component. The absorbent component can be any suitable absorbent component, such that the composition can be used as described herein. In some examples, the absorbent component includes at least one of a smectite, bentonite, attapulgite, montmorillonite, diatomaceous earth, Georgia White clay, sepiolite, tobermite, marls, kaolinite, halloysite, hectorite, beidellite, nontronite, saponite, Fuller's earth, guar gum, starch, xanthan gum, gum arabic, gum acacia, cellulosic material, superabsorbent polymers, and a silica gel. The absorbent component can be a bentonite component. The bentonite component can include at least one of sodium bentonite and calcium bentonite. In some embodiments the bentonite component is substantially sodium bentonite. The bentonite component can be untreated sodium bentonite clay. The bentonite component can be untreated Wyoming sodium bentonite clay. The absorbent component, or the bentonite component, can form any suitable proportion of the animal litter composition, such as about 30 wt % to about 90 wt % of the animal litter composition, about 60 wt % to about 80 wt %, about 30 wt % or less, or about 35, 40, 45, 50, 55, 60, 62, 64, 66, 68, 70, 72, 74, 76, 78, 80, 85, or about 90 wt % or more of the animal litter composition.

The bentonite component can include montmorillonite, for example, having the formula $(Na,Ca)_{0.33}(Al,Mg,Fe)_2(Si_4O_{10})(OH)_2 \cdot nH_2O$. The montmorillonite can include sodium montmorillonite. The montmorillonite can form any suitable proportion of the absorbent component or the bentonite component, such as about 40 wt % to about 100 wt %, or about 80 wt % to about 95 wt %, or about 40 wt % or less, or about 45 wt %, 50, 55, 60, 65, 70, 75, 80, 82, 84, 86, 88, 90, 92, 94, 96, 98, 99, 99.9, 99.99, or about 99.999 wt % or more.

The absorbent component or bentonite component can include water. In some embodiments, the absorbent component is substantially free of water. In some embodiments, the absorbent component has less than 2 wt %, 4, 6, 8, 10, 12, 14, 16, 18, or less than 20 wt % of water, or has about 0 wt % to about 20 wt % water, or about 0.001 wt % or less, or about 0.01 wt %, 0.1, 1, 2, 4, 6, 8, 10, 12, 14, 16, 18, or about 20 wt % water or more.

The bentonite component can include at least one of feldspar, quartz, gypsum, dolomite, illite, mica, and calcite. For example, about 5 wt % to about 20 wt % of the bentonite component can be at least one of feldspar, quartz, gypsum, dolomite, illite, mica, and calcite, or about 7 wt % to about 13 wt %, or about 5 wt % or less, or about 6, 7, 8, 9, 10, 11, 12, 13, 14, 15, 16, 17, 18, 19, or about 20 wt % or more of the bentonite component is at least one of feldspar, quartz, gypsum, dolomite, illite, mica, and calcite.

The absorbent component or the bentonite component can have any suitable bulk compacted density. For example, the absorbent component or the bentonite component can have a bulk compacted density of about 30 lb/ft$^3$ to about 95 lb/ft$^3$, about 40 lb/ft$^3$ to about 95 lb/ft$^3$, about 65 lb/ft$^3$ to about 80 lb/ft$^3$, about 30 lb/ft$^3$ or less, or about 32, 34, 36, 38, 40, 42, 44, 46, 48, 50, 52, 54, 56, 58, 60, 62, 64, 65, 66, 67, 68, 69, 70, 71, 72, 73, 74, 75, 76, 77, 78, 79, 80, 81, 82, 83, 84, 85, 86, 88, 90, 92, 94, or about 95 lb/ft$^3$ or more. In some examples, the absorbent component or the bentonite component can have a bulk uncompacted density of about 40 lb/ft$^3$ to about 95 lb/ft$^3$, about 55 lb/ft$^3$ to about 80 lb/ft$^3$, about 40 lb/ft$^3$ or less, or about 40, 45, 50, 55, 60, 62, 64, 66, 68, 70, 72, 74, 76, 78, 80, 82, 84, 86, 88, 90, 92, 94, or about 95 lb/ft$^3$ or more.

The absorbent component or the bentonite component can be granular and can have any suitable particle size, which can be the largest dimension of a particle. For example, about 70 wt % to about 100 wt % of the absorbent or bentonite component can have a particle size between about 10 mesh and about 70 mesh, or about 90 wt % to about 98 wt %, or about 70 wt % or less, or about 75, 80, 82, 84, 86, 88, 90, 91, 92, 93, 94, 95, 96, 97, 98, 99, 99.9, 99.99, or about 99.999 wt % or more can have a particle size between about 10 mesh and about 70 mesh. In some embodiments, about 0.01 wt %, 0.1, 1, 2, 3, 4, 5, 6, 7, 8, 9, or about 10 wt % can be greater than about 10 mesh. In some embodiments, about 0.000,1 wt %, 0.001, 0.01, 0.1, 1, 1.5, 2, 2.5, 3, 3.5, 4, 4.5, or about 5 wt % can be under about 70 mesh. In some embodiments, about 0.000,1 wt %, 0.000,5, 0.001, 0.005, 0.01, 0.05, 0.1, 0.5, 1, or about 2 wt % can be under about 200 mesh.

The weight ratio of the absorbent component (e.g., the bentonite component) to the pumice component can be any suitable weight ratio, such as about 1:1 to about 5:1, about 1.5:1 to about 3.5:1, about 2.0:1 to about 2.5:1, about 2.7:1 to about 3.3:1, or about 1:1 or less, or about 1.2:1, 1.4, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.8, 4, 4.2, 4.4, 4.6, 4.8, or about 5:1.

Pumice component.

The animal litter composition includes a pumice component. The pumice component can be any suitable pumice component, such that the animal litter composition can be used as described herein. The pumice component can be any suitable proportion of the animal litter composition. For example, about 5 wt % to about 60 wt % of the animal litter composition can be the pumice component, or about 20 wt % to about 35 wt %, or about 5, 10, 15, 20, 22, 24, 26, 28, 30, 32, 34, 35, 40, 45, 50, 55, or about 60 wt % or more.

The pumice can be any suitable pumice. In some embodiments, about 70 wt % to about 95 wt % of the pumice component is amorphous metal silicates, having a formula $M_xO_y\cdot SiO_2$, wherein the $SiO_2$ has a silica structure, and M is independently Al, Ca, Mg, Na, Fe, or K, such as about 70 wt % or less, 75 wt %, 80, 85, 90, or about 95 wt % or more. The pumice component can include at least one of rhyolite (e.g., quartz, alkali feldspar and plagioclase ((Na,Ca)AlSi$_3$O$_8$ to (Ca,Na)Al$_2$Si$_2$O$_8$), with biotite and hornblende as accessory minerals), dacite (e.g., an igneous, volcanic rock having an aphanitic to porphyritic texture and having an intermediate composition between andesite and rhyolite), andesite (e.g., extrusive igneous volcanic rock, of intermediate composition, with aphanitic to porphyritic texture, typically dominated by plagioclase plus pyroxene or hornblende, with magnetite, zircon, apatite, ilmenite, biotite, and garnet as common accessory minerals, and can have alkali feldspar present in minor amounts), pantellerite (e.g., a peralkaline rhyolite), phonolite (e.g., extrusive volcanic rock of intermediate chemical composition between felsic and mafic), and trachyte (e.g., an igneous volcanic rock with an aphanitic to porphyritic texture, including alkali feldspar; relatively minor plagioclase and quartz or a feldspathoid such as nepheline may also be present). The pumice component can include at least one of feldspar (e.g., KAlSi$_3$O$_8$—NaAlSi$_3$O$_8$—CaAl$_2$Si$_2$O$_8$), quartz (e.g., SiO$_2$), biotite (e.g., K(Mg,Fe)$_3$AlSi$_3$O$_{10}$(F,OH)$_2$), and hornblende ((Ca,Na)$_{2-3}$(Mg,Fe,Al)$_5$(Al,Si)$_8$O$_{22}$(OH,F)$_2$). The pumice can at least one of silicic, felsic, and basaltic.

The pumice component can include SiO$_2$, such as in the form of a silica structure or as in the form of Si and O atoms within the pumice component as various compounds. About 55 wt % to about 90 wt % of the pumice component can include SiO$_2$, or about 65 wt % to about 80 wt %, about 55 wt % or less, or about 60, 65, 66, 67, 68, 69, 70, 71, 72, 73, 74, 75, 76, 77, 78, 79, 80, 85, or about 90 wt % or more of the pumice component includes SiO$_2$.

The pumice component can include Al$_2$O$_3$, such as in the form of Al$_2$O$_3$ or in form of Al and O atoms within the pumice component as various compounds. For example, about 1 wt % to about 40 wt % of the pumice component can include Al$_2$O$_3$, about 5 wt % to about 20 wt %, or about 1 wt % or less, or about 2, 4, 5, 6, 7, 8, 9, 10, 11, 12, 13, 14, 15, 16, 17, 18, 19, 20, 22, 24, 26, 28, 30, 32, 34, 36, 38, or about 40 wt % or more of the pumice component can include Al$_2$O$_3$.

The pumice component can include K$_2$O, such as in the form of K$_2$O or in form of K and O atoms within the pumice component as various compounds. For example, about 0.001 wt % to about 8 wt % of the pumice component can include K$_2$O, or about 0.001 wt % to about 4 wt %, or about 0.001 wt % or less, or about 0.005 wt %, 0.01, 0.05, 0.1, 0.5, 1, 2, 3, 4, 5, 6, 7, or about 8 wt % or more.

The pumice component can include Na$_2$O, such as in the form of Na$_2$O or in form of Na and O atoms within the pumice component as various compounds. For example, about 0.001 wt % to about 8 wt % of the pumice component can include Na$_2$O, or about 0.001 wt % to about 4 wt %, or about 0.001 wt % or less, or about 0.005 wt %, 0.01, 0.05, 0.1, 0.5, 1, 2, 3, 4, 5, 6, 7, or about 8 wt % or more.

The pumice component can include Fe$_2$O$_3$, such as in the form of Fe$_2$O$_3$ or in form of Fe and O atoms within the pumice component as various compounds. In some embodiments, the pumice component can be substantially free of Fe$_2$O$_3$. In some embodiments, less than about 1 wt %, 2, 4, 6, or less than about 8 wt % of the pumice component can include Fe$_2$O$_3$, or about 0.001 wt % to about 4 wt % of the pumice component can include Fe$_2$O$_3$, or about 0.001 wt % to about 2 wt %, or about 0.001 wt % or less, or about 0.005 wt %, 0.01, 0.05, 0.1, 0.5, 1, 2, 3, 4, 5, 6, 7, or about 8 wt % or more.

The pumice component can include at least one of CaO, MgO, TiO$_2$, crystalline silica SiO$_2$, and water such as in the form of CaO, MgO, TiO$_2$, crystalline silica SiO$_2$, and water or such as in the form or Ca, Mg, Ti, and O atoms within the pumice component as various compounds. In some embodiments, the pumice component can be substantially free of at least one of CaO, MgO, TiO2, crystalline silica SiO$_2$, and water. In some embodiments, the pumice compound can include about 0 wt % to about 2 wt % of each of CaO, MgO, TiO$_2$, crystalline silica SiO$_2$, and water, or about 0.001 wt %, 0.005, 0.01, 0.05, 0.1, 0.5, 1, 1.5, or about 2 wt %.

The pumice component can have any suitable bulk density. For example, the pumice component can have a bulk density, such as a compacted or an uncompacted density, of about 10 lb/ft$^3$ to about 40 lb/ft$^3$, about 20 lb/ft$^3$ to about 30 lb/ft$^3$, or about 10 lb/ft$^3$ or less, or about 12 lb/ft$^3$, 14, 16, 18, 20, 21, 22, 23, 24, 25, 26, 27, 28, 29, 30, 32, 34, 36, 38 lb/ft$^3$, or about 40 lb/ft$^3$ or more.

The pumice component can have any suitable pH in water. For example, a 10 wt % solution in water can have a pH of about 8-10, or of about 7 or less, or about 7.5, 8, 8.5, 9, 9.5, 10, 10.5, 11, 11.5, or about 12 or more.

The pumice component can have any suitable hardness. In some embodiments, the pumice component has a Mohs hardness of about 3-8, or about 5-6, or about 3 or less, or about 4, 5, 6, 7, or about 8 or more.

The pumice component can be granular and can have any suitable particle size, which can be the largest dimension of a particle. The pumice component can have a particle size substantially between 9 mesh and 14 mesh. In some embodiments, about 60 wt % to about 100 wt % of the pumice component has a particle size between about 10 mesh and about 20 mesh, or about 75 wt % to about 95 wt %, or about 60 wt % or less, or about 65 wt %, 70 75, 80, 85, 90, 95, 96, 97, 98, 99, 99.9, 99.99, or about 99.999 wt %. In some embodiments, about 0 wt % is larger than 8 mesh, or about 1, 2, 3, 4, or about 5 wt % or more. In some embodiments, about 0 wt % to about 15 wt % is larger than 10 mesh, or about 2 wt % or less, 4 wt %, 6, 8, 10, 12, 14, or about 15 wt % or more. In some embodiments about 5 wt % to about 20 wt % is smaller than 20 mesh, or about 5 wt % or less, 6, 8, 10, 12, 14, 16, 18 wt %, or about 20 wt % or more. In some embodiments, about 0 wt % to about 5 wt % is smaller than 30 mesh, or about 1, 2, 3, 4, or about 5 wt % or more.

The animal litter composition can have any suitable weight ratio of the pumice component to the absorbent component (e.g., the bentonite component). For example, the weight ratio can be about 0.1:1 to about 0.8:1, or about 0.3:1 to about 0.5:1, or about 0.1:1 or less, or about 0.2:1, 0.3, 0.4, 0.5, 0.6, 0.7, or about 0.8:1 or more.

Silica component.

In some embodiments, the animal litter composition includes a silica component. The silica component can be any suitable silica component, such that the animal litter composition can be used as described herein. For example, the silica component can be an amorphous silica component. The combination of the pumice component and the silica component can be such that a composition including both a pumice component and a silica component has greater effectiveness as an animal litter than the combined effectiveness of an animal litter composition including pumice without silica, and an animal litter composition including silica without pumice. In some examples, at higher levels, a pumice component can reduce the clumping strength of an animal litter. In some embodiments, by using a silica component in addition to the pumice component, less pumice component is needed to bring the density of the composition to a targeted low density level, which in some embodiments can increase the clumping strength of the animal litter composition relative to other compositions having greater proportions of pumice therein. In some embodiments, the use of silica without pumice can result in segregation issues for the silica (e.g., settling out or dehomogenation), and can result in high cost of silica per unit mass of the animal litter, and in some examples a correspondingly high cost of the composition. Thus, in some embodiments, the use of a pumice component with the silica component can decrease the amount of segregation of the silica component, and can decrease the cost of silica per unit mass of the animal litter composition, which can result in a less costly animal litter composition.

Any suitable proportion of animal litter composition can be the silica component, such as the amorphous silica component. For example, the silica component can be about 0.01 wt % to about 20 wt % of the animal litter composition, about 2 wt % to about 8 wt %, or about 0.01 wt % or less, or about 0.05, 0.1, 0.5, 1, 2, 3, 4, 5, 6, 7, 8, 10, 12, 14, 16, 18, or about 20 wt % or more of the animal litter composition is the amorphous silica component.

Any suitable part of the silica component can be silica; for example, about 70 wt % to about 100 wt % of the silica component can be silica, about 90 wt % to about 98 wt %, or about 70 wt % or less, 75, 80, 85, 90, 92, 94, 96, 97, 98, 99, 99.9, 99.99, or about 99.999 wt % or more of the silica component is silica. The silica can be any suitable silica. Silica is an interconnected network of Si—O—Si bonds. A silicon atom in silica can have four bonds to oxygen, such as to 4 or 3 different oxygen atoms each further bonded to OH, a silicon atom, or double bonded to the same silicon. The Si—O—Si network can terminate with Si—OH bonds or Si=O bonds.

The silica component can include sodium sulfate. In some embodiments, the silica component is substantially free of sodium sulfate. In some embodiments, less than about 2 wt %, 4 wt %, or 6 wt % is sodium sulfate, or about 0.001 wt % to about 8 wt % of the silica component is sodium sulfate, about 0.001 wt % to about 4 wt %, or about 0.001 wt % or less, 0.005, 0.01, 0.05, 0.1, 0.05, 1, 2, 3, 4, 5, 6, 7, or about 8 wt % or more of the silica component is sodium sulfate.

The silica component can include water. In some embodiments, the silica component is substantially free of water. In some embodiments, less than about 2 wt %, 4 wt %, 6 wt %, 8 wt % or 10 wt % is water, or about 0.001 wt % to about 25 wt % of the silica component is water, or about 0.001 wt % to about 12 wt %, or about 0.001 wt %, 0.005, 0.01, 0.05, 0.1, 0.5, 1, 2, 3, 4, 5, 6, 7, 8, 10, 12, 14, 16, 18, 20, 22, 24, or about 25 wt % or more of the silica component is water.

The silica component can have any suitable surface area. The silica component can have a surface area of about 100 m$^2$/g to about 160 m$^2$/g, or about 20 m$^2$/g or less, 40, 60, 80, 100, 120, 140, 160, 180, 200, 220, 240, 260, 280, or about 300 m$^2$/g or more, such as a Brunauer-Emmett-Teller (BET) surface area.

The silica component can have any suitable density. For example, the silica component can have a density of about 5 lb/ft$^3$ to about 35 lb/ft$^3$, about 10 lb/ft$^3$ to 25 lb/ft$^3$, or about 5 lb/ft$^3$ or less, or about 6 lb/ft$^3$, 8, 10, 11, 12, 13, 14, 15, 16, 17, 18, 19, 20, 21, 22, 23, 24, 25, 26, 28, 30, 32, 34, or about 35 lb/ft$^3$ or more, such as a bulk compacted density, or such as a bulk uncompacted density.

The silica component can be granular and can have any suitable particle size, which can be the largest dimension of a particle. In some embodiments, about 60 wt % to about 100 wt % of the silica component has a particle size between about 18 mesh and about 50 mesh, or about 75 wt % to about 85 wt %, or about 60 wt % or less, or about 65, 70, 75, 80, 85, 90, 95, or about 100 wt % of the silica component has a particle size between about 18 mesh and about 50 mesh. In some examples, about 2 wt % or less, 4, 6, 8, 10, 12, 14, 16, 18, 20, 22, 24, 26, 28, or about 30 wt % of the silica component can be larger than about 18 mesh. In some examples, about 2 wt % or less, 4, 6, 8, 10, 12, 14, 16, 18, 20, 22, 24, 26, 28, or about 30 wt % can be smaller than about 50 mesh.

The weight ratio of the silica component to the combination of the absorbent component (e.g., the bentonite component) and the pumice component can be any suitable weight ratio, such as about 0.001:1 to about 0.5:1, about 0.02:1 to about 0.06:1, about 0.001:1 or less, or about 0.005:1, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.2, 0.3, 0.4, or about 0.5:1 or more. The weight ratio of the silica component to the absorbent component (e.g., the bentonite component) can be any suitable weight ratio, such as about 0.01:1 to about 0.2:1, about 0.02:1 to about 0.08:1, about 0.01:1 or less, or about 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.12, 0.14, 0.16, 0.18, or about 0.2:1 or more. The weight ratio of the silica component to the pumice component can be any suitable weight ratio, such as about 0.02:1 to about 0.5:1, about 0.05:1 to about 0.25:1, about 0.02:1 or less, or about 0.02, 0.04, 0.06, 0.08, 0.1, 0.11, 0.12, 0.13, 0.14, 0.15, 0.16, 0.17, 0.18, 0.19, 0.20, 0.21, 0.22, 0.23, 0.24, 0.25, 0.26, 0.28, 0.3, 0.35, 0.4, 0.45, or about 0.5:1.

Other components.

The animal litter composition can further include one or more components aside from the absorbent component, pumice component, and silica component. The animal litter composition can contain any number or amount of other suitable components, such that the animal litter composition can be effectively used as animal litter as described herein. Any component described in this section can independently be present in the composition in any suitable amount, such as about 0.000,001 wt % to about 50 wt % of the composition, about 0.000,001 wt % to about 5 wt % of the composition, about 0.001 wt % to about 2 wt % of the composition, or about 0.000,001 wt % or less, or about 0.000,01 wt %, 0.000, 1, 0.001, 0.01, 0.1, 1, 1.5, 2, 2.5, 3, 3.5, 4, 4.5, 5, 10, 15, 20, 25, 30, 35, 40, 45, or about 50 wt % of the animal litter composition or more. The additional component can be distributed on the exterior of one or more particles of the animal litter composition, the component can be homogenously mixed throughout the particle, or a combination thereof.

The animal litter composition can include at least one of an antimicrobial, odor absorber, odor inhibitor, odor-releasing agent, cellulosic material, filler, binder, density-modifier, coloring agent, fragrance, health-indicating material, non-stick release agents, de-dusting agent, and a superabsorbent material.

The animal litter composition can further include a cellulosic material. The cellulosic material can be any suitable cellulosic material, and can include at least one of an agricultural waste product and a biomass material. For example, the cellulosic material can be non-mineral swelling and non-swelling materials such as ground grains, ground seeds or husks, wood chips or wood dust, ground newspapers, and the like. For example, the cellulosic material can be derived from at least one of waste paper, trees, grains, fruits, cotton, vegetables, nuts, grasses, and peat. Cellulosic material sources from grains and starchy vegetables can include but are not limited to, rice, rice hulls, wheat, corn, corn cobs and husks, barley, oats, quinoa, and other suitable starches and grains or by-products thereof. Examples of cellulosic materials derived from fruits, include but are not limited to, citrus pulp (from lemons, oranges, grape-fruits, etc.), apple pulp, grape pulp, tomato pulp, and the like. Cellulosic material sources from cotton can include degraded cotton, cotton burns, cottonseed hulls, and the like. Cellulosic material sources from vegetables can include beet pulp, carrot pulp, and the like. Cellulosic material sources derived from nuts can include peanut shells, walnut shells, pecan shells, almond shells, and the like. Cellulosic material sources from grasses can include alfalfa, hay, straw, and the like.

The animal litter composition can further include a filler. The filler can be any suitable filler. For example, the filler can be at least one of limestone, sand, calcite, dolomite, recycled waste materials, zeolites, and gypsum. The filler can be incorporated with the other components to reduce the cost of the litter without significantly decreasing the animal litter's performance as a litter.

The animal litter can further include a density-modifier. The density modifier can be any suitable density modifier, such as a lightweight additive (e.g., an additive having a lower density than the absorbent component). For example, the density modifier can be at least one of perlite, expanded perlite, volcanic glassy materials, vermiculite, expanded vermiculite, pumice, silica gel, opaline silica, tuff, and agricultural byproducts. The density modifier can reduce the weight of the composition to reduce shipping costs, reduce the amount of material needed to fill the same relative volume of the litter container, and to make the material easier for customers to carry. In some embodiments, the present invention provides an absorbent clumping animal litter composition including an absorbent component and at least two components each having a lower density than the absorbent component, such that the composition has a bulk density of equal to or less than about 50 lb/ft$^3$, or about 35 lb/ft$^3$ to about 70 lb/ft$^3$, about 40 lb/ft$^3$ to about 55 lb/ft$^3$, or about 35 lb/ft$^3$ or less, or about 36 lb/ft$^3$ or less 37, 38, 39, 40, 41, 42, 43, 44, 45, 46, 47, 48, 49, 50, 51, 52, 53, 54, 55, 56, 57, 58, 59, 60, 62, 64, 66, 68, or about 70 lb/ft$^3$ or less.

The animal litter composition can further include a binder. The binder can help to hold together particulates of the animal litter composition, reduce dustiness, reduce tracking, and increase clump strength and clumpability. The binder can be any suitable binder. For example, the binder can be at least one of water, poly(acrylic acid), polytetrafluoroethylene (e.g., fibrillated Teflon®), lignin, lignin sulfonate, starch, poly(vinyl alcohol), styrene-butadiene copolymer, and styrene-acrylic acid copolymer. Water stable particles can also be made with crosslinked polyester network, such as those resulting from the reactions of polyacrylic acid or citric acid with different polyols such as glycerin, polyvinyl alcohol, lignin, and hydroxyethylcellulose.

In some embodiments, the binder includes at least one of a gel or a crosslinked gel. For example, the gel or crosslinked gel can include at least one of a linear polysaccharide and a poly(($C_2$-$C_{10}$)alkenylene), wherein the ($C_2$-$C_{10}$)alkenylene is substituted or unsubstituted. In some examples, the gel or crosslinked gel can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly (vinyl pyrrolidone), polyacrylamide, poly (hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. The gel or crosslinked gel can form any suitable proportion of the animal litter composition, such as about 0.001 wt % to about 10 wt % of the composition, about 0.001 wt % or less, or about 0.005 wt %, 0.01, 0.05, 0.1, 0.2,0.3, 0.4, 0.5, 0.6, 0.7, 0.8, 0.9, 1, 1.5, 2, 3, 4, 5, 6, 7, 8, 9, or about 10 wt % of the composition.

In some examples, the animal litter composition further includes at least one crosslinking agent. The crosslinking agent can be any suitable crosslinking agent. For example, the crosslinking agent can include at least one of chromium, aluminum, antimony, zirconium, titanium, calcium, boron, iron, silicon, copper, zinc, magnesium, and an ion thereof. The crosslinking agent can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate. The crosslinker can be present in any suitable proportion of the animal litter composition, such as about 0.000,001 wt % to about 5 wt % of the composition, about 0.001 wt % to about 2 wt % of the composition, or about 0.000,001 wt % or less, or about 0.000,01 wt %, 0.000,1, 0.001, 0.01, 0.1, 1, 1.5, 2, 2.5, 3, 3.5, 4, 4.5, or about 5 wt % of the animal litter composition or more.

The animal litter composition can include a de-dusting agent. The de-dusting agent can be any suitable de-dusting agent that reduces the dustiness of the animal litter composition. In some embodiments, the de-dusting agent is a coating or binder on or in the particles of the animal litter composition. In some examples, the de-dusting agent can include at least one of a gum, resin, and water, or other liquids or liquefiable materials.

In one embodiment of the invention, the composition is substantially free of any color masking agents, dyes, pigments or the like. In an alternate embodiment of the invention, the animal litter composition can include at least one of a suitable dye, colorant, bleach, lightener, and the like, which can be added to vary the color of absorbent particles, such as to lighten the color of litter so it is more appealing to at least one of the consumer and the animal.

The animal litter composition can further include an antimicrobial agent. The antimicrobial agent can be any suitable antimicrobial agent that can reduce microbe concentrations in the litter composition, such as after urination or defecation in the composition. In some examples, the antimicrobial agent can include at least one of a zeolite, clinoptilolite, borax, boric acid, borax pentahydrate, borax decahydrate, polyborate, tetraboric acid, and sodium metaborate.

The animal litter composition can further include a superabsorbent material. The superabsorbent material can be any suitable superabsorbent material. The superabsorbent material can increase the absorbency of the animal litter composition, and increase clump strength and clumpability. In some examples, the superabsorbent material is a superabsorbent polymer, such as at least one of a poly-acrylic acid sodium salt, a polyacrylamide copolymer, ethylene-maleic anhydride copolymer, cross-linked carboxymethylcellulose, a polyvinyl alcohol copolymer, cross-linked polyethylene oxide, and a starch-grafted copolymer of polyacrylonitrile. In some embodiments, the superabsorbent material can absorb about 2 times its weight in water or less, or about 4, 6, 8, 10, 12, 14, 15, 18, 20, 25, 30, 35, 40, 45, or about 50 times its weight in water or more.

In some embodiments, the animal litter composition includes at least one of an odor absorbing material and an odor inhibiting material. The odor absorbing material or odor inhibiting material can be any suitable material that helps to control the odor emanating from the animal litter composition, particularly after an animal urinates or defecates in the litter. In some embodiments, the material can absorb odors, such as by trapping molecules that are perceived as the odor. In some embodiments, the material can emit a more pleasant masking odor to cover an unpleasant odor. For example, the odor absorbing material or odor inhibiting material can include at least one of a metal oxide nanoparticle, cyclodextrin, zeolite, activated carbon, a carboxylic acid, a silver salt, a copper salt, a zinc salt, an iron salt, an aluminum salt, Zinc chloride, zinc gluconate, zinc lactate, zinc maleate, zinc salicylate, zinc sulfate, zinc ricinoleate, copper chloride, and copper gluconate.

The animal litter composition can further include at least one of a curable material, a resin, fly ash, metakaolin, shale, slate, pumice, zeolite, a set retarding additive, a surfactant, a weight reducing additive, a heavy-weight additive, dispersant, a crystalline silica compound, an amorphous silica, a salt, a fiber, a hydratable clay, a microsphere, pozzolan lime, water, an aqueous base, an aqueous acid, an alcohol or polyol, a cellulose, a starch, an alkalinity control agent, an acidity control agent, a density control agent, a density modifier, a surfactant, a polymeric stabilizer, a crosslinking agent, a polyacrylamide, a polymer or combination of polymers, an antioxidant, a heat stabilizer, a foam control agent, a solvent, a plasticizer, a filler or inorganic particle, a pigment, and a dye.

System.

In various embodiments, the present invention provides a system. The system can be any system that includes the animal litter composition as described herein, including systems relating to the manufacture, packaging, transportation, sale, and use of the animal litter composition.

In some embodiments, the system includes an embodiment of the absorbent clumping animal litter composition described herein, such as an absorbent clumping animal litter composition including an absorbent component and a pumice component. The system can also include a container (e.g., a litter box) for animal urination and defecation including the animal litter composition therein.

Method of making an absorbent clumping animal litter composition.

In various embodiments, the present invention provides a method of making an absorbent clumping animal litter composition. The method can be any suitable method that generates an embodiment of the absorbent clumping animal litter composition described herein.

In some embodiments, the method includes forming an embodiment of the absorbent clumping animal litter composition described herein, such as an absorbent clumping animal litter composition including an absorbent component and a pumice component.

Method of using an animal litter composition.

In various embodiments, the present invention provides a method of using an absorbent clumping animal litter composition. The method can be any suitable method that includes any use of an embodiment of the absorbent clumping animal litter composition described herein, including methods of use relating to manufacture, packaging, transportation, sale, and use by a consumer.

In some embodiments, the method can include placing an embodiment of the absorbent clumping animal litter composition described herein in a container for animal urination and defecation. The absorbent clumping animal litter composition can include an absorbent component and a pumice component. The method can include allowing an animal to at least one of urinate and defecate in the container such that at least one of urine and feces contacts the clumping animal litter composition. The method can include allowing time to pass such that the clumping animal litter composition forms clumps at least in locations where the urine contacted the animal litter composition. The method can also include at least partially removing the feces and clumps from the container to remove at least part of the feces and urine from the container.

EXAMPLES

Various embodiments of the present invention can be better understood by reference to the following Examples which are offered by way of illustration. The present invention is not limited to the Examples given herein.

Example 1

Blend 1 and Blend 2

Two animal litter formulations were generated, Blend 1 and Blend 2, having the compositions indicated in Table 1. Bentonite Performance Minerals (BPM) product NATIONAL® 12 is Wyoming sodium bentonite, having a compacted density of about 65 lb/ft³, and having 94 wt % of particulates between 10 mesh and 70 mesh, with 5 wt % above 10 mesh, 1 wt % below 70 mesh, and 0.5% below 200 mesh. Navajo Brand® Pumice is mined as natural ore from open pits in Espanola, N. Mex., having a density of 25 lb/ft³, and having 0 wt % of particulates larger than 8 mesh, 0-15 wt % of particulates larger than 10 mesh, 5-20 wt % of particulates smaller than 20 mesh, and 0-5 wt % of particulates smaller than 30 mesh. Zeofree® 5180 Amorphous Silica has a density of about 17 lb/ft³, having 10 wt % of particulates larger than 18 mesh, and 10 wt % smaller than 50 mesh.

TABLE 1

Animal litter formulations.

| Component | Blend 1 (wt %) | Blend 2 (wt %) |
|---|---|---|
| NATIONAL® 12 | 69.1 | 71.1 |
| Navajo® Pumice Grade 6 | 30.9 | 24.6 |
| Zeofree® 5180 Amorphous Silica | — | 4.3 |

Example 2

Density and Clump Strength of Blend 1 and Blend 2

Compacted density. Compacted density measurements were taken by filling a graduated cylinder with about 500 mL of the litter blend, recording the weight to the nearest 0.01 g and agitating the material until the volume stabilized. The final volume was then recorded to the nearest 2 mL, and used along with the recorded mass to generate a density reading. Density measurements for each blend are presented in Table 2.

Clump strength. The litter blends were tested for clump strength by filling a 9"×9" container with at least 2" of material and allowing 10 mL of a 2 wt % sodium chloride solution to drop through a burette at a height of 3" onto the litter. A small portion of the litter was then placed on top of the damp section and the entire litter was allowed to sit and form a clump over a period of 5 minutes. Next, the clump was removed using a grated scoop and weighed to the nearest 0.01 g. The clump was then dropped from a height of 10" onto a ¾" mesh screen. The intact portion of the clump remaining on the sieve was then reweighed. The final weight of the clump was reported as a percentage of the original, pre-drop weight. All clump strength measurements were performed in triplicate and averaged.

TABLE 2

Density and clump strength of Blend 1 and Blend 2.

| Property | NATIONAL® 12 | Blend 1 | Blend 2 |
|---|---|---|---|
| Compacted Density (lb/ft³) | 73 | 48.7 | 49.9 |
| Clump Strength (%) | 96 | 76 | 90 |

Blend 1 and Blend 2 had a compacted bulk density which was approximately 25% lower than that of Bentonite Performance Minerals (BPM) product NATIONAL® 12, while maintaining sufficient clumping ability and acceptable dust and odor control.

Example 3

Dustiness of Blend 1 and Blend 2

Blend 1 and Blend 2 were subjected to a de-dusting treatment. About 200 mL of each litter was allowed to fall freely through a funnel with ½" aperture 7" above a 12" diameter round container and filmed against a black background under heavy LED lighting. The treated lightweight litters had a dust level comparable to an untreated sample of NATIONAL® 12.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of this invention as defined by the appended claims.

Additional embodiments.

The following exemplary embodiments are provided, the numbering of which is not to be construed as designating levels of importance:

Embodiment 1 provides an absorbent clumping animal litter composition comprising: an absorbent component; and a pumice component.

Embodiment 2 provides the animal litter composition of claim 1, wherein the animal litter composition has a compacted bulk density of about 35 lb/ft³ to about 70 lb/ft³.

Embodiment 3 provides the animal litter composition of any one of Embodiments 1-2, wherein the animal litter composition has a compacted bulk density of about 40 lb/ft$^3$ to about 55 lb/ft$^3$.

Embodiment 4 provides the animal litter composition of any one of Embodiments 1-3, wherein the absorbent component comprises at least one of a smectite, bentonite, attapulgite, montmorillonite, diatomaceous earth, Georgia White clay, sepiolite, tobermite, marls, kaolinite, halloysite, hectorite, beidellite, nontronite, saponite, Fuller's earth, guar gum, starch, xanthan gum, gum arabic, gum acacia, cellulosic material, a superabsorbent polymer, and a silica gel.

Embodiment 5 provides the animal litter composition of any one of Embodiments 1-4, wherein the absorbent component is a bentonite component.

Embodiment 6 provides the animal litter composition of Embodiment 5, wherein the bentonite component comprises at least one of sodium bentonite and calcium bentonite.

Embodiment 7 provides the animal litter composition of any one of Embodiments 5-6, wherein the bentonite component comprises untreated sodium bentonite clay.

Embodiment 8 provides the animal litter composition of any one of Embodiments 5-7, wherein the bentonite component comprises untreated Wyoming sodium bentonite clay.

Embodiment 9 provides the animal litter composition of any one of Embodiments 5-8, wherein about 30 wt % to about 90 wt % of the animal litter composition is the bentonite component.

Embodiment 10 provides the animal litter composition of any one of Embodiments 5-9, wherein about 60 wt % to about 80 wt % of the animal litter composition is the bentonite component.

Embodiment 11 provides the animal litter composition of any one of Embodiments 5-10, wherein the bentonite component comprises montmorillonite having the formula (Na, Ca)$_{0.33}$(Al,Mg,Fe)$_2$(Si$_4$O$_{10}$)(OH)$_2$·nH$_2$O.

Embodiment 12 provides the animal litter composition of any one of Embodiments 5-11, wherein the bentonite component comprises sodium montmorillonite.

Embodiment 13 provides the animal litter composition of any one of Embodiments 5-12, wherein about 40 wt % to about 100 wt % of the bentonite component is montmorillonite.

Embodiment 14 provides the animal litter composition of any one of Embodiments 5-13, wherein about 80 wt % to about 95 wt % of the bentonite component is montmorillonite.

Embodiment 15 provides the animal litter composition of any one of Embodiments 5-14, wherein about 0 wt % to about 20 wt % of the bentonite component is water.

Embodiment 16 provides the animal litter composition of any one of Embodiments 5-15, wherein about 5 wt % to about 20 wt % of the bentonite component is at least one of feldspar, quartz, gypsum, dolomite, illite, mica, and calcite.

Embodiment 17 provides the animal litter composition of any one of Embodiments 5-16, wherein about 7 wt % to about 13 wt % of the bentonite component is at least one of feldspar, quartz, gypsum, dolomite, illite, mica, and calcite.

Embodiment 18 provides the animal litter composition of any one of Embodiments 5-17, wherein the bentonite component has a bulk compacted density of about 40 lb/ft$^3$ to about 95 lb/ft$^3$.

Embodiment 19 provides the animal litter composition of any one of Embodiments 5-18, wherein the bentonite component has a bulk compacted density of about 65 lb/ft$^3$ to about 80 lb/ft$^3$.

Embodiment 20 provides the animal litter composition of any one of Embodiments 5-19, wherein about 70 wt % to about 100 wt % of the bentonite component has a particle size between about 10 mesh and about 70 mesh.

Embodiment 21 provides the animal litter composition of any one of Embodiments 5-20, wherein about 90 wt % to about 98 wt % of the bentonite component has a particle size between about 10 mesh and about 70 mesh.

Embodiment 22 provides the animal litter composition of any one of Embodiments 1-21, wherein the weight ratio of the absorbent component to the pumice component is about 1:1 to about 5:1.

Embodiment 23 provides the animal litter composition of any one of Embodiments 1-22, wherein the weight ratio of the absorbent component to the pumice component is about 1.5:1 to about 3.5:1.

Embodiment 24 provides the animal litter composition of any one of Embodiments 1-23, wherein about 5 wt % to about 60 wt % of the animal litter composition is the pumice component.

Embodiment 25 provides the animal litter composition of any one of Embodiments 1-24, wherein about 20 wt % to about 35 wt % of the animal litter composition is the pumice component.

Embodiment 26 provides the animal litter composition of any one of Embodiments 1-25, wherein about 70 wt % to about 95 wt % of the pumice component is amorphous metal silicates, having a formula M$_x$O$_y$·SiO$_2$, wherein M is independently Al, Ca, Mg, Na, Fe, or K.

Embodiment 27 provides the animal litter composition of any one of Embodiments 1-26, wherein the pumice component comprises at least one of rhyolite, dacite, andesite, pantellerite, phonolite, and trachyte.

Embodiment 28 provides the animal litter composition of any one of Embodiments 1-27, wherein the pumice component comprises at least one of feldspar, quartz, biotite, and hornblende.

Embodiment 29 provides the animal litter composition of any one of Embodiments 1-28, wherein about 55 wt % to about 90 wt % of the pumice component comprises SiO$_2$.

Embodiment 30 provides the animal litter composition of any one of Embodiments 1-29, wherein about 65 wt % to about 80 wt % of the pumice component comprises SiO$_2$.

Embodiment 31 provides the animal litter composition of any one of Embodiments 1-30, wherein about 1 wt % to about 40 wt % of the pumice component comprises Al$_2$O$_3$.

Embodiment 32 provides the animal litter composition of any one of Embodiments 1-31, wherein about 5 wt % to about 20 wt % of the pumice component comprises Al$_2$O$_3$.

Embodiment 33 provides the animal litter composition of any one of Embodiments 1-32, wherein about 0.001 wt % to about 8 wt % of the pumice component comprises K$_2$O.

Embodiment 34 provides the animal litter composition of any one of Embodiments 1-33, wherein about 0.001 wt % to about 8 wt % of the pumice component comprises Na$_2$O.

Embodiment 35 provides the animal litter composition of any one of Embodiments 1-34, wherein about 0.001 wt % to about 4 wt % of the pumice component comprises Fe$_2$O$_3$.

Embodiment 36 provides the animal litter composition of any one of Embodiments 1-35, wherein each of CaO, MgO, TiO$_2$, crystalline silica SiO$_2$, and water comprise about 0 wt % to about 2 wt % of the pumice component.

Embodiment 37 provides the animal litter composition of any one of Embodiments 1-36, wherein the pumice component has a bulk density of about 10 lb/ft$^3$ to about 40 lb/ft$^3$.

Embodiment 38 provides the animal litter composition of any one of Embodiments 1-37, wherein the pumice component has a bulk density of about 20 lb/ft$^3$ to about 30 lb/ft$^3$.

Embodiment 39 provides the animal litter composition of any one of Embodiments 1-38, wherein the pumice component has a pH in a 10 wt % solution in water of about 8-10.

Embodiment 40 provides the animal litter composition of any one of Embodiments 1-39, wherein the pumice component has a Mohs hardness of about 5-6.

Embodiment 41 provides the animal litter composition of any one of Embodiments 1-40, wherein the pumice component has a particle size substantially between 9 mesh and 14 mesh.

Embodiment 42 provides the animal litter composition of any one of Embodiments 1-41, wherein about 60 wt % to about 100 wt % of the pumice component has a particle size between about 10 mesh and about 20 mesh.

Embodiment 43 provides the animal litter composition of any one of Embodiments 1-42, wherein about 75 wt % to about 95 wt % of the pumice component has a particle size between about 10 mesh and about 20 mesh.

Embodiment 44 provides the animal litter composition of any one of Embodiments 1-43, wherein the weight ratio of the pumice component to the absorbent component is about 0.1:1 to about 0.8:1.

Embodiment 45 provides the animal litter composition of any one of Embodiments 1-44, wherein the weight ratio of the pumice component to the absorbent component is about 0.3:1 to about 0.5:1.

Embodiment 46 provides the animal litter composition of any one of Embodiments 1-45, further comprising a silica component.

Embodiment 47 provides the animal litter composition of Embodiment 46, wherein the silica component is an amorphous silica component.

Embodiment 48 provides the animal litter composition of Embodiment 47, wherein about 0.01 wt % to about 20 wt % of the animal litter composition is the amorphous silica component.

Embodiment 49 provides the animal litter composition of any one of Embodiments 47-48, wherein about 2 wt % to about 8 wt % of the animal litter composition is the amorphous silica component.

Embodiment 50 provides the animal litter composition of any one of Embodiments 47-49, wherein about 70 wt % to about 100 wt % of the amorphous silica component is silica.

Embodiment 51 provides the animal litter composition of any one of Embodiments 47-50, wherein about 90 wt % to about 98 wt % of the amorphous silica component is silica.

Embodiment 52 provides the animal litter composition of any one of Embodiments 47-51, wherein about 0.001 wt % to about 8 wt % of the amorphous silica component is sodium sulfate.

Embodiment 53 provides the animal litter composition of any one of Embodiments 47-52, wherein about 0.001 wt % to about 4 wt % of the amorphous silica component is sodium sulfate.

Embodiment 54 provides the animal litter composition of any one of Embodiments 47-53, wherein about 0.001 wt % to about 25 wt % of the amorphous silica component is water.

Embodiment 55 provides the animal litter composition of any one of Embodiments 47-54, wherein about 0.001 wt % to about 12 wt % of the amorphous silica component is water.

Embodiment 56 provides the animal litter composition of any one of Embodiments 47-55, wherein the amorphous silica component has a surface area of about 100 m$^2$/g to about 160 m$^2$/g.

Embodiment 57 provides the animal litter composition of any one of Embodiments 47-56, wherein the amorphous silica component has a density of about 5 lb/ft$^3$ to about 35 lb/ft$^3$.

Embodiment 58 provides the animal litter composition of any one of Embodiments 47-57, wherein the amorphous silica component has a density of about 10 lb/ft$^3$ to 25 lb/ft$^3$.

Embodiment 59 provides the animal litter composition of any one of Embodiments 47-58, wherein about 60 wt % to about 100 wt % of the amorphous silica component has a particle size between about 18 mesh and about 50 mesh.

Embodiment 60 provides the animal litter composition of any one of Embodiments 47-59, wherein about 75 wt % to about 85 wt % of the amorphous silica component has a particle size between about 18 mesh and about 50 mesh.

Embodiment 61 provides the animal litter composition of any one of Embodiments 47-60, wherein a weight ratio of the amorphous silica component to a combination of the absorbent component and the pumice component is about 0.001:1 to about 0.5:1.

Embodiment 62 provides the animal litter composition of any one of Embodiments 47-61, wherein a weight ratio of the amorphous silica component to a combination of the absorbent component and the pumice component is about 0.02:1 to about 0.06:1.

Embodiment 63 provides the animal litter composition of any one of Embodiments 47-62, wherein a weight ratio of the amorphous silica component to the absorbent component is about 0.01:1 to about 0.2:1.

Embodiment 64 provides the animal litter composition of any one of Embodiments 47-63, wherein a weight ratio of the amorphous silica component to the absorbent component is about 0.02:1 to about 0.08:1.

Embodiment 65 provides the animal litter composition of any one of Embodiments 47-64, wherein a weight ratio of the amorphous silica component to the pumice component is about 0.02:1 to about 0.5:1.

Embodiment 66 provides the animal litter composition of any one of Embodiments 47-65, wherein a weight ratio of the amorphous silica component to the pumice component is about 0.05:1 to about 0.25:1.

Embodiment 67 provides the animal litter composition of any one of Embodiments 1-66, wherein the animal litter composition further comprises at least one of an antimicrobial, odor absorber, odor inhibitor, odor-releasing agent, cellulosic material, filler, binder, density-modifier, coloring agent, fragrance, health-indicating material, nonstick release agents, de-dusting agent, and a superabsorbent material.

Embodiment 68 provides the animal litter composition of any one of Embodiments 1-67, wherein the animal litter composition further comprises a cellulosic material.

Embodiment 69 provides the animal litter composition of Embodiment 68, wherein the cellulosic material comprises at least one of an agricultural waste product and a biomass material.

Embodiment 70 provides the animal litter composition of any one of Embodiments 68-69, wherein the cellulosic material is derived from at least one of waste paper, trees, grains, fruits, cotton, vegetables, nuts, grasses, and peat.

Embodiment 71 provides the animal litter composition of any one of Embodiments 1-70, wherein the animal litter composition further comprises a filler.

Embodiment 72 provides the animal litter composition of Embodiment 71, wherein the filler comprises at least one of limestone, sand, calcite, dolomite, recycled waste materials, zeolites, and gypsum.

Embodiment 73 provides the animal litter composition of any one of Embodiments 1-72, wherein the animal litter composition further comprises a density-modifier.

Embodiment 74 provides the animal litter composition of Embodiment 73, wherein the density modifier comprises at least one of perlite, expanded perlite, volcanic glassy materials, vermiculite, expanded vermiculite, pumice, silica gel, opaline silica, tuff, and agricultural byproducts.

Embodiment 75 provides the animal litter composition of any one of Embodiments 1-74, wherein the animal litter composition further comprises a binder.

Embodiment 76 provides the animal litter composition of Embodiment 75, wherein the binder comprises at least one of water, poly(acrylic acid), polytetrafluoroethylene, lignin, lignin sulfonate, starch, poly(vinyl alcohol), styrene-butadiene copolymer, and styrene-acrylic acid copolymer.

Embodiment 77 provides the animal litter composition of any one of Embodiments 75-76, wherein the binder comprises at least one of a gel or a crosslinked gel.

Embodiment 78 provides the animal litter composition of any one of Embodiments 75-77, wherein the binder comprises at least one of a linear polysaccharide and a poly(($C_2$-$C_{10}$)alkenylene), wherein the ($C_2$-$C_{10}$)alkenylene is substituted or unsubstituted.

Embodiment 79 provides the animal litter composition of any one of Embodiments 75-78, wherein the binder comprises at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 80 provides the animal litter composition of any one of Embodiments 77-79, wherein the animal litter composition further comprises at least one crosslinking agent.

Embodiment 81 provides the animal litter composition of Embodiment 80, wherein the crosslinking agent comprises at least one of chromium, aluminum, antimony, zirconium, titanium, calcium, boron, iron, silicon, copper, zinc, magnesium, and an ion thereof Embodiment 82 provides the animal litter composition of any one of Embodiments 80-81, wherein the crosslinking agent comprises at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate.

Embodiment 83 provides the animal litter composition of any one of Embodiments 1-82, wherein the animal litter composition further comprises a de-dusting agent.

Embodiment 84 provides the animal litter composition of Embodiment 83, wherein the de-dusting agent comprises at least one of a gum, resin, and water.

Embodiment 85 provides the animal litter composition of any one of Embodiments 1-84, wherein the animal litter composition further comprises at least one of a dye, colorant, bleach, and a lightener.

Embodiment 86 provides the animal litter composition of any one of Embodiments 1-85, wherein the animal litter composition further comprises an antimicrobial agent.

Embodiment 87 provides the animal litter composition of Embodiment 86, wherein the antimicrobial agent comprises at least one of a zeolite, clinoptilolite, borax, boric acid, borax pentahydrate, borax decahydrate, polyborate, tetraboric acid, and sodium metaborate.

Embodiment 88 provides the animal litter composition of any one of Embodiments 1-87, wherein the animal litter composition comprises a superabsorbent material.

Embodiment 89 provides the animal litter composition of Embodiment 88, wherein the superabsorbent material is a superabsorbent polymer.

Embodiment 90 provides the animal litter composition of any one of Embodiments 88-89, wherein the superabsorbent material comprises at least one of poly-acrylic acid sodium salt, a polyacrylamide copolymer, ethylene-maleic anhydride copolymer, cross-linked carboxymethylcellulose, a polyvinyl alcohol copolymer, cross-linked polyethylene oxide, and a starch-grafted copolymer of polyacrylonitrile.

Embodiment 91 provides the animal litter composition of any one of Embodiments 1-90, wherein the animal litter composition comprises at least one of an odor absorbing material and an odor inhibiting material.

Embodiment 92 provides the animal litter composition of Embodiment 91, wherein the odor absorbing material or odor inhibiting material comprises at least one of a metal oxide nanoparticle, cyclodextrin, zeolite, activated carbon, a carboxylic acid, a silver salt, a copper salt, a zinc salt, an iron salt, an aluminum salt, Zinc chloride, zinc gluconate, zinc lactate, zinc maleate, zinc salicylate, zinc sulfate, zinc ricinoleate, copper chloride, and copper gluconate.

Embodiment 93 provides the animal litter composition of any one of Embodiments 1-92, wherein the animal litter composition further comprises at least one of a curable material, a resin, fly ash, metakaolin, shale, slate, pumice, zeolite, a set retarding additive, a surfactant, a weight reducing additive, a heavy-weight additive, dispersant, a crystalline silica compound, an amorphous silica, a salt, a fiber, a hydratable clay, a microsphere, pozzolan lime, water, an aqueous base, an aqueous acid, an alcohol or polyol, a cellulose, a starch, an alkalinity control agent, an acidity control agent, a density control agent, a density modifier, a surfactant, a polymeric stabilizer, a crosslinking agent, a polyacrylamide, a polymer or combination of polymers, an antioxidant, a heat stabilizer, a foam control agent, a solvent, a plasticizer, a filler or inorganic particle, a pigment, and a dye.

Embodiment 94 provides an absorbent clumping animal litter composition comprising: an absorbent component; a pumice component; and an amorphous silica component.

Embodiment 95 provides an absorbent clumping animal litter composition comprising: about 60 wt % to about 80 wt % of a bentonite component comprising about 80 wt % to about 100 wt % montmorillonite; about 20 wt % to about 35 wt % of a pumice component comprising about 55 wt % to about 90 wt % $SiO_2$; and about 0.01 wt % to about 8 wt % of an amorphous silica component comprising about 70 wt % to about 100 wt % silica; wherein the animal litter composition has a compacted bulk density of about 35 lb/ft$^3$ to about 70 lb/ft$^3$.

Embodiment 96 provides an absorbent clumping animal litter composition comprising: an absorbent component; at least two components having a lower density than the absorbent component, such that the composition has a bulk density of equal to or less than about 50 lb/ft$^3$.

Embodiment 97 provides a system comprising: an absorbent clumping animal litter composition comprising an absorbent component and a pumice component; and a container for animal urination and defecation comprising the animal litter composition therein.

Embodiment 98 provides a method of preparing an absorbent clumping animal litter composition, the method comprising: forming an absorbent clumping animal litter composition comprising an absorbent component; and a pumice component.

Embodiment 99 provides a method of using an absorbent clumping animal litter composition, the method comprising: placing an absorbent clumping animal litter composition in a container for animal urination and defecation, the absorbent clumping animal litter composition comprising an absorbent component and a pumice component; allowing an animal to at least one of urinate and defecate in the container such that at least one of urine and feces contacts the clumping animal litter composition; allowing time to pass such that the clumping animal litter composition forms clumps at least in locations where the urine contacted the animal litter composition; and at least partially removing the feces and clumps from the container to remove at least part of the feces and urine from the container.

Embodiment 100 provides the apparatus or method of any one or any combination of Embodiments 1-99 optionally configured such that all elements or options recited are available to use or select from.

What is claimed is:

1. An absorbent clumping animal litter composition comprising:
    an absorbent component;
    a pumice component; and
    an amorphous silica component,
    wherein a weight ratio of the amorphous silica component to a combination of the absorbent component and the pumice component is about 0.001:1 to about 0.5:1.

2. The absorbent clumping animal litter composition of claim 1, wherein the animal litter composition has a compacted bulk density of about 35 lb/ft$^3$ to about 70 lb/ft$^3$.

3. The absorbent clumping animal litter composition of claim 1, wherein the absorbent component is a bentonite component.

4. The absorbent clumping animal litter composition of claim 3, wherein about 30 wt % to about 90 wt % of the animal litter composition is the bentonite component.

5. The animal litter composition of claim 4, wherein the bentonite component has a bulk compacted density of about 40 lb/ft$^3$ to about 95 lb/ft$^3$.

6. The absorbent clumping animal litter composition of claim 1, wherein the weight ratio of the absorbent component to the pumice component is about 1:1 to about 5:1.

7. The absorbent clumping animal litter composition of claim 1, wherein about 5 wt % to about 60 wt % of the animal litter composition is the pumice component.

8. The absorbent clumping animal litter composition of claim 1, wherein about 70 wt % to about 95 wt % of the pumice component is amorphous metal silicates, having a formula $M_xO_y \cdot SiO_2$, wherein M is independently Al, Ca, Mg, Na, Fe, or K.

9. The absorbent clumping animal litter composition of claim 1, wherein about 55 wt % to about 90 wt % of the pumice component comprises $SiO_2$.

10. The absorbent clumping animal litter composition of claim 1, wherein the pumice component has a bulk density of about 10 lb/ft$^3$ to about 40 lb/ft$^3$.

11. The absorbent clumping animal litter composition of claim 1, wherein the weight ratio of the pumice component to the absorbent component is about 0.1:1 to about 0.8:1.

12. The absorbent clumping animal litter composition of claim 1, wherein about 0.01 wt % to about 20 wt % of the animal litter composition is the amorphous silica component.

13. The absorbent clumping animal litter composition of claim 1, wherein about 0.001 wt % to about 8 wt % of the amorphous silica component is sodium sulfate.

14. The absorbent clumping animal litter composition of claim 1, wherein the amorphous silica component has a surface area of about 100 m$^2$/g to about 160 m$^2$/g.

15. The absorbent clumping animal litter composition of claim 1, wherein the amorphous silica component has a density of about 5 lb/ft$^3$ to about 35 lb/ft$^3$.

16. The absorbent clumping animal litter composition of claim 1, wherein the animal litter composition further comprises at least one of an antimicrobial agent, odor absorber, odor inhibitor, odor-releasing agent, cellulosic material, filler, binder, density-modifier, coloring agent, bleach, lightener, fragrance, health-indicating material, nonstick release agent, de-dusting agent, gel, crosslinked gel, crosslinking agent, and a superabsorbent material.

17. An absorbent clumping animal litter composition comprising:
    about 60 wt % to about 80 wt % of a bentonite component comprising about 80 wt % to about 100 wt % montmorillonite;
    about 20 wt % to about 35 wt % of a pumice component comprising about 55 wt % to about 90 wt % $SiO_2$; and
    an amorphous silica component comprising about 70 wt % to about 100 wt % silica wherein a weight ratio of the amorphous silica component to a combination of the bentonite component and the pumice component is about 0.001:1 to about 0.5:1; and wherein the animal litter composition has a compacted bulk density of about 35 lb/ft$^3$ to about 70 lb/ft$^3$.

18. An absorbent clumping animal litter composition comprising:
    an absorbent component;
    a pumice component; and
    an amorphous silica component,
    wherein the pumice component has a bulk density of about 10 lb/ft$^3$ to about 40 lb/ft$^3$.

19. An absorbent clumping animal litter composition comprising:
    an absorbent component;
    a pumice component; and
    an amorphous silica component,
    wherein the amorphous silica component has a surface area of about 100 m$^2$/g to about 160 m$^2$/g.

* * * * *